Oct. 4, 1960

P. G. DRONG 2,954,985

SELF-STEERING TANDAM BOGIE

Filed Oct. 31, 1955

INVENTOR
PETER G. DRONG
BY
Williamson, Schroeder, Adams & Meyers
ATTORNEYS

Oct. 4, 1960 P. G. DRONG 2,954,985
SELF-STEERING TANDAM BOGIE
Filed Oct. 31, 1955 2 Sheets-Sheet 2

INVENTOR
PETER G. DRONG
BY
Williamson, Schroeder, Adams + Meyers
ATTORNEYS

United States Patent Office 2,954,985
Patented Oct. 4, 1960

2,954,985

SELF-STEERING TANDEM BOGIE

Peter G. Drong, Hibbing, Minn.

Filed Oct. 31, 1955, Ser. No. 543,669

11 Claims. (Cl. 280—104.5)

This invention relates to vehicles having a rear tandem axle bogie and has special reference to a bogie which automatically steers itself and facilitates steering of the vehicle.

In motor truck vehicles which haul heavy loads, it is common practice to provide the vehicle with an auxiliary set of wheels rearwardly of, and in alignment with, the usual rear wheels in order to receive and bear part of the load. Vehicles provided with such auxiliary wheels are difficult to steer as is commonly known. The steering of these vehicles produces forces which subject parts of the vehicle to great strain when the vehicle is moving in a curved path because the rear portion of the vehicle cannot pivot simultaneously on two points, that is on each of the wheels of the bogie on the inside of the turn. Thus, unless some provision is made to permit such pivotal movement or at least closely approximate the same, the tires of the wheels must be dragged laterally by the vehicle when a turn is made because the tandem wheel arrangement opposes any force tending to change the direction of the vehicle's travel off a straight path. This is the cause of difficult steering and extreme and excessive wear on the vehicle's tires, front and rear, due to scuffing.

In addition to the excessive wear on the tires of the vehicle due to scuffing, there is a distinct tendency in vehicles utilizing a rear tandem axle bogie for dangerous skidding on roads made slippery by rain, snow, ice, mud or other road conditions which are not ideal. It is known that a wheel mounted so as to preclude turning about a vehicle axis has a greater tendency to skid than one that can so turn, even if the turning movement is only slight for the gripping power of the wheel is decreased substantially once it ceases to rotate about its horizontal axis and skids laterally. A tandem axle bogie of the conventional type prevents such turning movements and thus once the vehicle supported thereby commences to skid badly, it seldom comes out of the skid without a serious accident occurring. In my U.S. Patent No. 2,579,556 I have set forth and claimed one manner of at least partially overcoming these disadvantages. My present invention however constitutes a very distinct improvement over the means shown in my said previous patent.

It is a general object of my invention to provide a novel and improved rear tandem-axle bogie of unusual simplicity in construction and operation.

A more specific object is to provide a novel and improved rear tandem-axle bogie which will more effectively reduce or completely eliminate excessive wear on its tires during turning movements of the vehicle which it supports.

Another object is to provide a novel and improved rear tandem-axle bogie which will greatly facilitate steering of the vehicle supported thereby and will substantially increase the degree of safety with which curves and turns may be negotiated with the vehicle supported thereby.

Another object is to provide a novel and improved rear tandem-axle bogie which will eliminate the hazard of "free wheel plowing" of the bogie when the vehicle supported thereby is directed around a curve in the road.

Another object is to provide a novel and improved bogie of the type described which is unusually simple in manufacture, servicing and maintenance.

Another object is to provide a novel rear tandem-axle bogie constructed to permit relatively free movement of the axle-carrying frames relative to the chassis, this movement being possible in all directions.

Another object is to provide a novel rear tandem-axle bogie constructed to include means for supporting the load and distributing the same between its axles while yet permitting such movement in all directions.

Another object is to provide a novel rear tandem-axle bogie constructed to permit the wheels thereof to follow a natural turning radius or circle during turning movements of the vehicle and thus provide greater safety.

Another object is to provide a novel rear tandem-axle bogie constructed to effectively prevent "whipping" of the vehicle from side to side when carrying a live load at relatively high speeds.

Another object is to provide a novel rear tandem-axle bogie constructed to reduce or completely eliminate excessive wear on the tires during turning movements of the vehicle which it supports by providing for turning movements of the wheels thereof around a common curve and yet permitting backing movement of the vehicle without difficulty.

These and other objects and advantages of my invention will more fully appear from the following description made in connection with the accompanying drawings wherein like reference characters refer to the same parts throughout the several views and in which.

Figure 1:
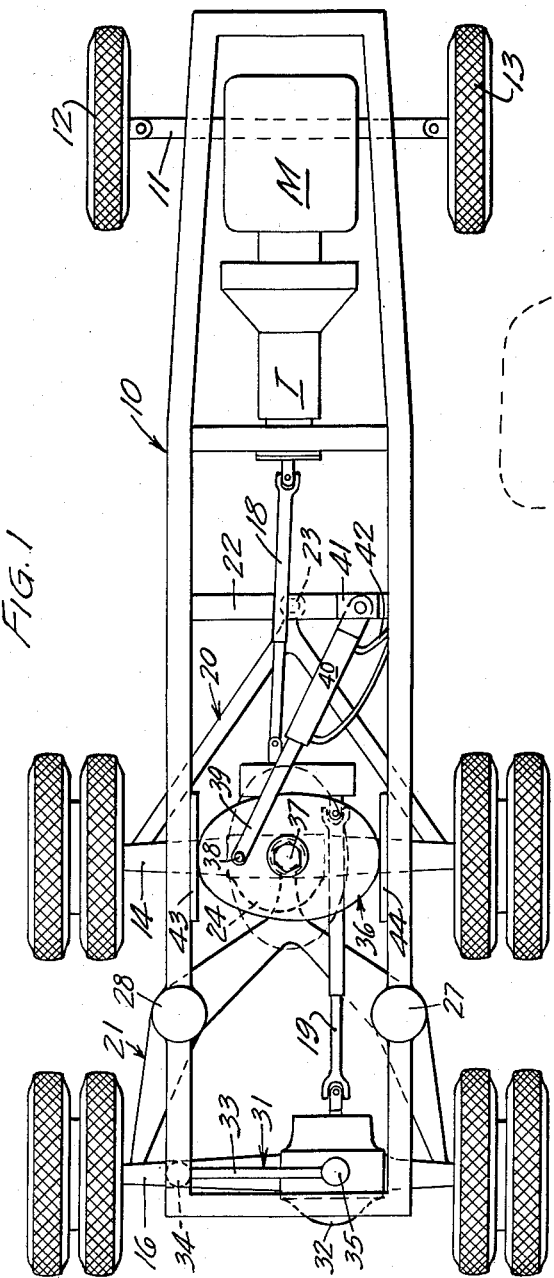
Fig. 1 is a plan view of one embodiment of my invention.

One embodiment of my invention may include as shown in Figs. 1–6 a vehicle chassis indicated generally as 10 and having a front steering axle 11 with steering wheels 12 and 13 rotatably mounted thereon. Disposed beneath the rear portions of the elongated chassis 10 is a transversely extending housing 14 for the foremost tandem axle 15 of the bogie. A second housing 16 is disposed rearwardly of the housing 14 and houses a transversely extending axle 17 which is the rearmost axle of the bogie. A drive shaft 18 extends rearwardly from the transmission T of the motor M and drives the foremost axle 15. An auxiliary drive shaft 19 drives the rearmost axle 17 of the bogie.

Figure 2:
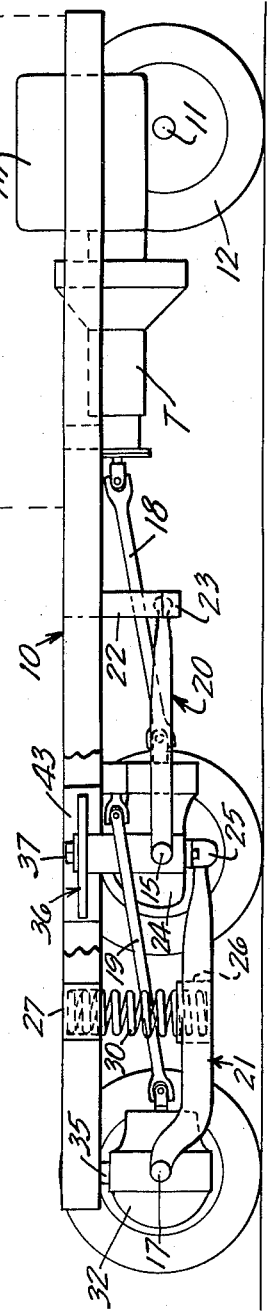
Fig. 2 is a side elevational view of the same with the rear wheels removed and parts thereof broken away.

To suspend the bogie I utilize a pair of A frames, the forward one of which is designated by the numeral 20 and the rear one of which is designated by the numeral 21, as best shown in Figs. 1 and 2. The forward A frame 20 is pivotally connected to a member 22, which depends from the chassis 10, by a ball and socket joint 23. The rearward A frame 21 is pivotally connected to the differential housing 24, carried by the axle housing 14, by a ball and socket connection 25.

Figure 3:
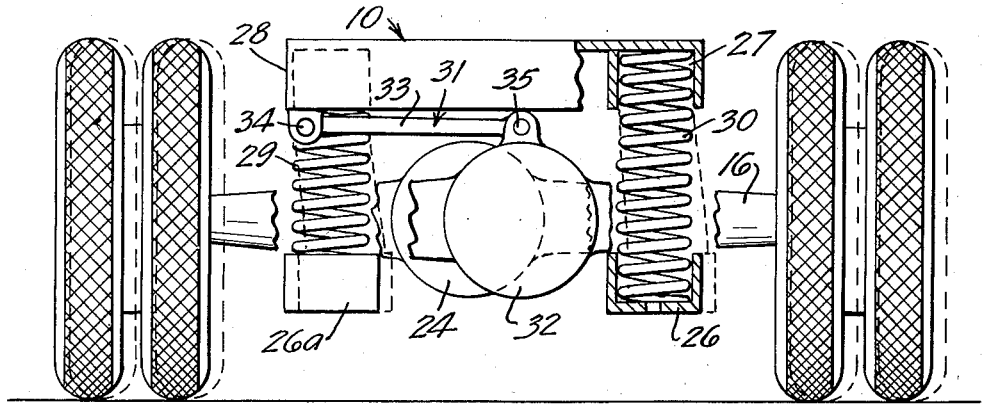
Fig. 3 is an elevational view of the rear tandem axle bogie with parts thereof broken away.
Figure 4:
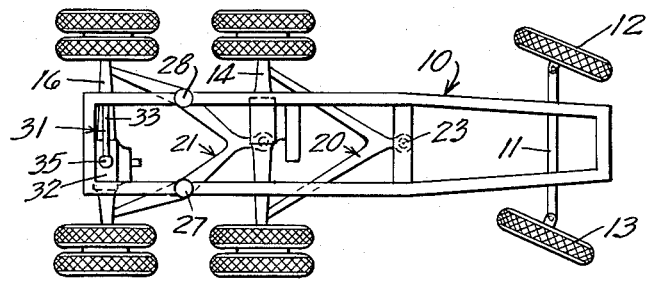
Fig. 4 is a plan view on a reduced scale of the embodiment shown in Fig. 1 with the steering wheels of the vehicle shown in proper position for commencing to negotiate a turn or curve with the vehicle.
Figure 5:
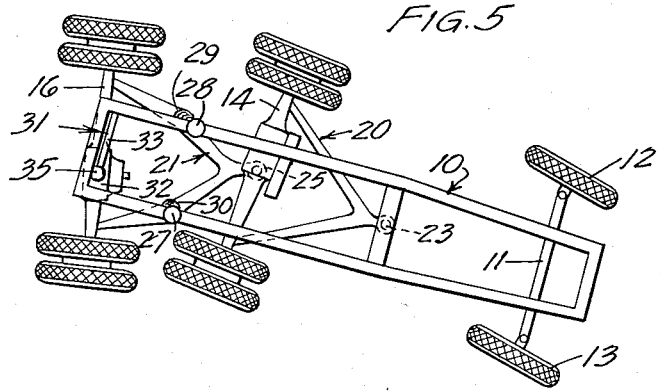
Fig. 5 is a plan view on a reduced scale showing the same vehicle shortly after the vehicle has commenced to negotiate the curve and showing the relative positions of the front and rear axles of the tandem bogie.

Formed in the opposite sides of the A frame 21, approximately midway between the forward axle 15 and the rearward axle 17 is a pair of pockets 26 and 26a as best shown in Figs. 2 and 3. These pockets 26 and 26a are disposed directly below the opposite sides of the chassis 10 when the vehicle is travelling along a straight line as best shown in Figs. 1, 4 and 5. Formed in the opposite sides of the chassis 10 is a similar pair of pockets 27 and 28 which open downwardly directly above the upwardly facing pockets 26 and 26a of the A frame 21. Carried within these pockets 26, 27 and 26a, 28 is a pair of elongated heavy metal coiled springs 29 and 30. These springs are of the heavy duty type and are preferably of substantial length so as to provide greater flexibility and resilience. They are preferably sufficiently flexible and resilient so as to permit relative movement in all directions between the A frame 21 and the chassis 10. At the same time they must be sufficiently sturdy to support the load to be carried by the chassis 10.

Figure 6:
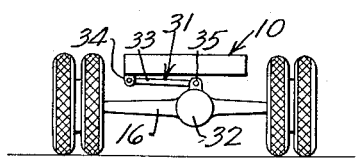
Fig. 6 is a rear elevational view of the embodiment shown in Fig. 1 on a reduced scale.

A stabilizer 31 connects chassis 10 with the differential housing 32 which is carried by the rear axle housing 16. The stabilizer 31 is comprised of an elongated rigid arm 33 which is connected pivotally at one of its ends by a ball and socket 34 to the chassis 10 as best shown in Figs. 1 and 6. At its opposite end this rigid arm 33 is connected by a ball and socket joint 35 to the top of the differential housing 32. These ball and socket joints 34 and 35 are of the well known type, having a resilient lining so as to permit limited moving action of the arm 33 in all directions.

Pivotally mounted atop the differential housing 24 as best shown in Figs. 1 and 2, is a flat locking plate 36 of generally elliptoidal shape. This locking plate 36 is mounted for rotation about its center point at 37 and is pivotally connected by a pivot pin 38 to an air or vacuum piston 39 which extends rearwardly from a cylinder 40. The cylinder 40 is pivotally secured by a mounted bracket 41 which is carried by the chassis 10. A line 42 connects the cylinder 40 to a source of air pressure (not shown). A pair of abutment plates 43 and 44 are carried by the chassis 10 directly opposite the locking plate 36 so that this plate may bear thereagainst to accomplish its locking function.

In use the air piston 39 is actuated by the operator in any of the conventional manners to cause the locking plate 36 to swing to the broken line unlocked position shown in Fig. 1 and is permitted to thereafter move within the cylinder freely. This enables the A frame 20 to be freely swung to either side of the chassis 10 and enables it to follow during turning movements of the chassis in a true trailing manner. Thus when the steering wheels 12 and 13 are turned to the right, the axle 15 will turn as shown in Fig. 5 in the same direction that the steering wheels 12 and 13 turn but to a lesser degree. It is apparent that the A frame 20 will trail so that the tires mounted on the axle 15 will turn about a common radius or curve with the steering wheels 12 and 13. The ball and socket connection 23 permits this trailing movement and thereby all excessive wear of the tires mounted on the axle 15 which would normally be caused by scuffing or lateral slipping is avoided. The wheels carried by the axle 15 have a natural turning radius as compared to the steering wheels 12 and 13. It will be noted that when the A frame shifts, as shown in Fig. 5 the axle 15 actually shifts to the left relative to the chassis when the steering wheels 12 and 13 are turned toward the right. This shifting movement of the axle about the pivot provided by the ball and socket connection 23 gives a natural turning radius to the wheels carried by the axle 15.

Simultaneous with the shifting of the axle 15 laterally relative to the chassis 10 the ball and socket connection 25 is also shifted laterally to the left as will be readily apparent by reference to Fig. 5. This shifting to the left of the ball and socket connection 25 causes the A frame 21 to shift axle 17 to a limited degree about a verticle axis so that the wheels carried by the rear axle 17 will be turned slightly to the left in contrast to the wheels carried by the front axle 15, the wheels of which are turned slightly to the right. In this manner the wheels carried by the axle 17 are also disposed about a common radius or curve so as to substantially eliminate all scuffing action on the wheels carried by the rear axle 17. The stabilizer 31 prevents more than limited movement of the axle 17.

It will also be noted however that the springs 29 and 30, in addition to supporting the chassis 10, also serve to guide both the front axle 15 and the rear axle 17. It is readily apparent that the load on the chassis 10 will be supported solely by these springs 29 and 30 at the rear of the chassis and that the weight will be distributed between the two axles 15 and 17. It is also apparent that the heavy duty springs 29 and 30 provide a guiding force on the front A frame 20 and tend to prevent this A frame 20 from turning too far during any turning movement of the vehicle. These springs 29 and 30 are strongly resilient and somewhat flexible so that it is possible for the chassis to move in any direction relative to the A frame 21. In other words, lateral movement is possible between the oppositely disposed and vertically spaced cups. These springs however provide a strong urging force toward keeping the A frames 20 and 21 in aligned relation with the chassis 10. However they are sufficiently flexible so that when a curve is negotiated as shown in Fig. 5, the A frames 20 and 21 may shift sufficiently relative to the chassis 10 so as to arrange the axles 15 and 17 about a common center of rotation.

As soon as the curve has been negotiated the springs 29 and 30 bring the A frames 20 and 21 back into trailing relation with the steering wheels 12 and 13 so that the wheels carried by these axles will again be moving parallel to the chassis 10. Thus the A frames 20 and 21 receive substantial guiding from the coiled springs 29 and 30. It should also be noted that the springs 29 and 30 substantially preclude what is known in the art as "whipping" from side to side when a live load is carried by the chassis 10. In other words these springs substantially limit the lateral movement of the A frames 20 and 21 in swinging laterally relative to the chassis 10 and prevent the chassis 10 from snapping to the left and right as a result of shifting live loads.

When it is desired to back the vehicle the locking plate is moved to a locking position as shown in Fig. 1 through actuation of the piston 39. When in this position the A frame 20 is locked against any lateral movement relative to the chassis 10 so that the vehicle may be effectively backed to any desired location.

Thus it can be seen that my rear tandem-axle bogie provides a number of distinct advantages over rear tandem-axle bogies previously known in the art. The entire construction of my rear tandem-axle bogie is of unusual simplicity, both as to construction and operation and hence may be manufactured and utilized inexpensively.

One of the principal advantages of my rear tandem-axle bogie, in addition to the elimination of excessive wear on the tires, is the fact that curves and turns may now be negotiated with such a vehicle with substantially increased safety. My rear tandem axle bogie is so designed that it substantially eliminates "plowing" of the bogie when the vehicle is guided around a curve. The term "plow" is utilized in reference to the tendency of a wheel to skid laterally and "plow" through the road surface rather than to continue to rotate and thereby more effectively grip the road surface. The turning of the axles as shown in Fig. 5 tends to eliminate this "plowing" tendency and hence a turn or curve may be negotiated with substantially greater safety.

It will, of course, be understood that various changes may be made in the form, details, arrangement and proportion of the parts without departing from the scope of my invention which consists of the matter shown and described herein and set forth in the appended claims.

What is claimed is:

1. In a vehicle bogie suspension, a chassis adapted to carry a load, a wheeled axle connected to said chassis and constructed and arranged in partial-load-supporting position, a second wheeled axle disposed rearwardly of said first mentioned axle and being pivotable relative thereto about a vertical axis, connecting means extending between and pivotally interconnecting said first and second mentioned wheeled axles for pivotable relative movement about a vertical axis disposed ahead of said rearwardly disposed axle, stabilizer means connecting one of said axles to said chassis and permitting only limited lateral movement thereof relative to said chassis and resiliently flexible combined support and guiding means extending between said chassis and said connecting means and constructed and arranged in guiding relation to said rearwardly disposed wheeled axle, said combined support and guiding means constituting the sole supporting means for said chassis whereby the weight of said chassis and its load will be distributed between said wheeled axles and whereby said rearwardly disposed axle will be guided during turning movements of said chassis.

2. In a vehicle bogie suspension, a chassis adapted to carry a load, a wheeled axle connected to said chassis in partial-load-supporting position, a second wheeled axle disposed rearwardly of said first mentioned axle and being pivotable relative thereto about a vertical axis, connecting means extending between and pivotally interconnecting said first and second mentioned wheeled axles for pivotable relative movement about a vertical axis disposed ahead of said rearwardly disposed axle, stabilizer means connecting one of said axles to said chassis and permitting only limited lateral movement thereof relative to said chassis, and resiliently flexible combined support and guiding means connecting said chassis and said connecting means and constructed and arranged in guiding relation to said rearwardly disposed axle, said combined support and guiding means constituting the sole supporting means for said chassis whereby said rearwardly disposed axle will be guided during turning movements of said chassis, said combined support and guiding means including a single resilient member performing both the chassis-supporting function and the axle-guiding function.

3. In a vehicle bogie suspension, a chassis adapted to carry a load, a wheeled axle connected to said chassis and disposed therebelow, a second wheeled axle disposed in tandem relation to said first mentioned axle and being pivotable relative thereto about a vertical axis, connecting means extending between and swingably interconnecting said first and second mentioned axles for movement about a vertical axis, stabilizer means connecting one of said axles to said chassis, and a pair of resiliently flexible combined support and guiding means extending between opposed sides of said chassis and said connecting means and constructed and arranged in guiding relation to said second mentioned wheeled axle, said combined support and guiding means constituting the sole supporting means for said chassis whereby the weight of the chassis and its load will be distributed between said wheeled axles and whereby said second mentioned axle will be guided during turning movements of said chassis, each of said combined support and guiding means constituting a single spring member.

4. In a vehicle bogie suspension, a chassis adapted to carry a load, a wheeled axle connected to said chassis, a second wheeled axle disposed in tandem relation to said first mentioned axle and being pivotable relative thereto about a vertical axis, connecting means extending between and pivotally interconnecting said axles for substantial angular movements relative to each other about an upright axis, stabilizer means connecting one of said axles to said chassis and permitting only limited lateral movement thereof relative to said chassis, and resiliently flexible combined support and guide means extending between said chassis and said connecting means and constructed and arranged in guiding relation to said second mentioned wheeled axle, said combined support and guide means constituting the sole supporting means for said chassis whereby the weight of said load will be distributed between said wheeled axles and whereby said second mentioned axle will be guided during turning movements of said chassis, said combined support and guide means being comprised solely of a plurality of spaced vertically extending spring members, each of said members performing both the chassis-supporting function and the axle-guiding function.

5. In a vehicle bogie suspension, a chassis adapted to carry a load, a wheeled axle pivotally connected to said chassis about a vertical axis spaced forwardly of said axle and disposed therebelow, a second wheeled axle disposed rearwardly thereof in tandem relation thereto, means pivotally connecting said rearwardly disposed axle directly to said first mentioned axle for movement about a vertical axis spaced forwardly of said rearward axle, resiliently flexible combined support and guiding means extending between said chassis and said connecting means in supporting relation to said chassis and in guiding relation to said axles, and being the sole supporting means for supporting said chassis upon said connecting means, whereby the weight of said chassis and its load will be distributed between said axles and whereby said axles will be guided during turning movements of said chassis along a common curve, and stabilzing means connecting said chassis with said rearwardly disposed axle and permitting only limited swinging movement thereof relative to said chassis about said last mentioned vertical axis.

6. The structure defined in claim 5 and lock means connecting said first mentioned axle and said chassis and being adapted when locked to hold said first mentioned axle against swinging angular movements relative to said chassis about said first mentioned vertical axis.

7. In a vehicle bogie suspension, a chassis adapted to carry a load, a wheeled axle disposed below said chassis, an A frame connected with said axle and extending forwardly therefrom, means pivotally connecting said A frame to said chassis for movement about a vertical axis disposed ahead of said axle, a second wheeled axle disposed in tandem relation to said first mentioned axle and rearwardly thereof, an A frame connected to said second mentioned axle and extending forwardly to said first mentioned axle, means pivotally connecting said second mentioned A frame with said first mentioned axle at a point substantially midway between its wheels for movement about a vertical axis disposed ahead of said second mentioned axle, resiliently flexible combined support and guiding means extending between said second mentioned A frame and said chassis in guiding relation to said second mentioned A frame and constituting the sole supporting means for said chassis whereby the weight of said chassis and its load will be distributed between said wheeled axles, and whereby each of said axles will be guided along a common curve during turning movements of said chassis, and a stabilizer connecting one of said axles with said chassis and permitting only limited lateral movement relative thereto about its vertical axis.

8. The structure defined in claim 7, and locking mechanism connected with said first mentioned axle for locking the same against swinging movement about a vertical axis relative to said chassis in order to facilitate backing of said chassis when desired.

9. In a vehicle bogie suspension, a chassis adapted to carry a load and having opposite sides, a wheeled axle disposed below said chassis, an A frame connected to said axle and extending forwardly therefrom, means pivotally connecting said A frame to said chassis at the forward portion thereof for movement about a vertical axis disposed ahead of said axle, a second wheeled axle disposed rearwardly of said first mentioned axle and arranged in tandem relation thereto, an A frame connected with said second mentioned axle and extending forwardly therefrom, means pivotally connecting the forward portion of said second mentioned A frame with said first mentioned axle for movement about a vertical axis extending through said first mentioned axle at a point substantially midway between its wheels and ahead of said second mentioned axle, a stabilizer connecting one of said axles with said chassis and permitting only limited lateral movement about its vertical axis and relative to said chassis, and a pair of strong coiled springs, one each of which extends between opposite sides of said chassis to said second mentioned A frame in supporting relation to said chassis and in guiding relation to said second mentioned A frame, said spring constituting the sole supporting means for said chassis whereby the weight of said chassis and its load will be distributed between said wheeled axles and whereby said axles will be guided along a common curve during turning movements of said chassis.

10. In a vehicle bogie suspension, a chassis adapted to carry a load, a wheeled axle pivotally connected to said chassis for angular movement relative to the chassis about a vertical axis disposed forwardly of said axle, and being disposed therebelow, a second wheeled axle disposed in tandem relation to said first-mentioned axle, connecting means pivotally connecting said first and second mentioned wheeled axles for movement about a second vertical axis disposed forwardly of the rear tandem axle, stabilizing means connecting one of said axles with said chassis for permitting only limited swinging lateral movement of said one axle relative to said chassis, and resiliently flexible combined support and guiding means extending between said chassis and said connecting means in sole supporting relation to said chassis and in guiding relation to both of said axles, said connecting means and combined support and guiding means being the sole support of said chassis whereby the weight of said chassis and its load will be distributed between said wheeled axles and whereby each of said axles will be guided along a common curve during turning movement of said chassis.

11. In a vehicle bogie suspension, a chassis adapted to carry a load, a pair of rear wheeled axles associated with said chassis and arranged in tandem relation therebelow, one of said axles being pivotally connected to said chassis for movement about a vertical axis disposed ahead of said one axle, connecting means swingably connecting the other of said axles directly to said one pivotally connected axle for movement about a second vertical axis disposed ahead of said other axle, stabilizing means connecting one of said axles with said chassis and permitting only limited lateral movement thereof relative to said chassis, and a single resiliently flexible spring member extending between said chassis and said connecting means at each side of said chassis in supporting relation to said chassis and in guiding relation to said axles, said members constituting the sole supporting means for said chassis whereby the weight of said chassis and its load will be distributed between said wheeled axles and whereby each of said axles will be guided along a common curve during turning movements of said chassis.

References Cited in the file of this patent

UNITED STATES PATENTS

| | | |
|---|---|---|
| 1,871,735 | Prins | Aug. 16, 1932 |
| 1,881,070 | Falk | Oct. 4, 1932 |
| 2,139,937 | Collender | Dec. 12, 1938 |
| 2,269,728 | Mills | Jan. 13, 1942 |
| 2,493,025 | Pointer | Jan. 3, 1950 |
| 2,579,556 | Drong | Dec. 25, 1951 |

FOREIGN PATENTS

| | | |
|---|---|---|
| 395,144 | Great Britain | July 13, 1933 |
| 660,794 | Germany | June 2, 1938 |
| 830,899 | Germany | Feb. 7, 1952 |
| 858,928 | Germany | Dec. 11, 1952 |
| 1,078,037 | France | May 5, 1954 |
| 738,583 | Great Britain | Oct. 19, 1955 |